United States Patent [19]
Sibik

[11] Patent Number: 5,848,535
[45] Date of Patent: Dec. 15, 1998

[54] CONTROL SYSTEM HAVING A BINOMIAL SETPOINT FILTER

[75] Inventor: Lee Sibik, Onalaska, Wis.

[73] Assignee: Gas Research Institute, Chicago, Ill.

[21] Appl. No.: 822,012

[22] Filed: Mar. 24, 1997

[51] Int. Cl.⁶ .............................. G05B 5/01; G05D 15/00
[52] U.S. Cl. .............................. 62/99; 236/78 D; 318/611
[58] Field of Search .......................... 236/78 D; 364/183; 62/99, 158, 201; 165/268; 318/611

[56] References Cited

U.S. PATENT DOCUMENTS

| | | | |
|---|---|---|---|
| 4,143,415 | 3/1979 | Klingbeil ................................ | 364/105 |
| 4,589,060 | 5/1986 | Zinsmeyer ............................. | 364/148 |
| 4,753,388 | 6/1988 | Rummage ............................ | 236/78 D |
| 4,755,924 | 7/1988 | Hiroi ...................................... | 364/148 |
| 4,848,099 | 7/1989 | Beckey et al. ..................... | 236/78 D X |
| 4,872,104 | 10/1989 | Holsinger ............................. | 364/166 |
| 4,959,767 | 9/1990 | Buchner et al. ........................ | 364/151 |
| 4,991,770 | 2/1991 | Bird et al. .............................. | 236/440 |
| 5,029,066 | 7/1991 | Hiroi ...................................... | 364/162 |
| 5,059,880 | 10/1991 | Hiroi ...................................... | 318/610 |
| 5,195,028 | 3/1993 | Hiroi ...................................... | 364/161 |
| 5,216,896 | 6/1993 | Uchida et al. ............................ | 62/148 |
| 5,245,529 | 9/1993 | Hiroi ...................................... | 364/161 |
| 5,335,165 | 8/1994 | Shinskey ................................ | 364/162 |
| 5,419,146 | 5/1995 | Sibik et al. ............................ | 62/115 |
| 5,485,367 | 1/1996 | Hiroi ...................................... | 364/160 |
| 5,541,833 | 7/1996 | Bristol et al. ........................... | 364/165 |

FOREIGN PATENT DOCUMENTS

| | | | |
|---|---|---|---|
| 0102047 | 6/1983 | Japan .................................. | 236/78 D |
| 406074516 | 3/1994 | Japan .................................. | 236/78 D |

*Primary Examiner*—William Wayner
*Attorney, Agent, or Firm*—Speckman Pauley Petersen & Fejer

[57] ABSTRACT

A control system for controlling overshoot in response to a setpoint input to the control system is provided. The control system includes a feedback loop connected to the control system via a summing node; and a binomial filter arranged to receive a setpoint input and to provide a filtered setpoint output to the control system via the summing node. The control system includes the binomial filter to provide a filtered setpoint output having a gradual initial response to the control system via the summing node. A method of controlling a water chiller system to provide a supply of leaving water at a preselected temperature is also provided. The method has the steps of: providing a control system for the water chiller system, the control system having an input; selecting a setpoint temperature; filtering the setpoint temperature using a binomial filter to provide a filtered setpoint; and providing the filtered setpoint to the input of the control system.

8 Claims, 5 Drawing Sheets

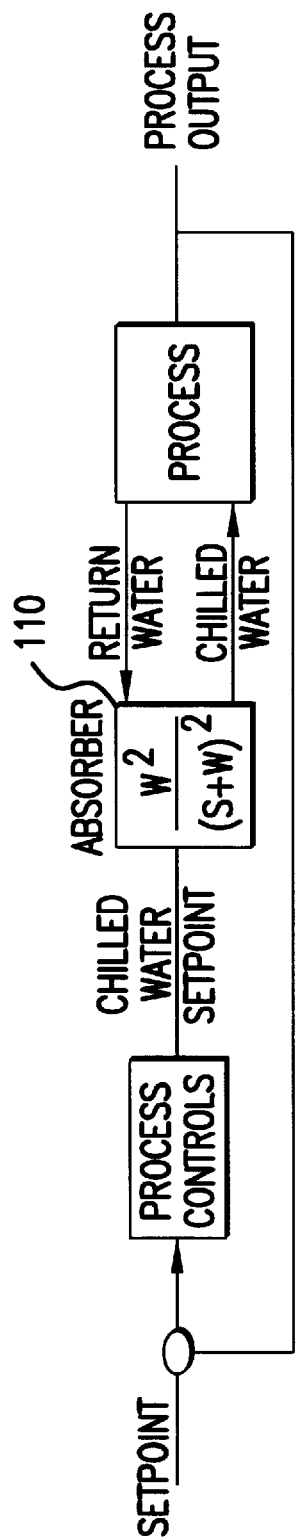

CONTROL SYSTEM HAVING A BINOMIAL SETPOINT FILTER

BACKGROUND OF THE INVENTION

The present invention is directed generally to control systems and more particularly to a control system having a binomial setpoint filter to eliminate overshoot without reducing the response to process disturbances.

Control systems are available for monitoring and controlling virtually all kinds of systems and machines. Control systems are often utilized because of their economic benefits. For example, the ability to hold a process closer to a desired operating constraint is an advantage. Such controls also increase the safety of the system and also increase the efficiency.

Two basic types of control systems exist. One type of control system is a regulation (regulatory) control system. This type of control system is used primarily to respond to changes and disturbances to the system. Examples of devices controlled by regulation control systems include water chiller machines which are used to provide cooling water for comfort cooling applications.

Another type of control system is a tracking control system. This type of control tracks a change in a setpoint or a related input. Such a control system improves the control of the machine. For example, an initial setpoint is entered to a system or machine, and the control system tracks any deviations from the machine and tries to maintain operation of the machine at the desired setpoint.

Simply stated, a closed loop control system consists of a process, a measurement of the controlled variable, and a controller which compares the actual measurement with the desired value and uses a difference between them to automatically adjust one of the inputs to the process. The physical system to be controlled can be electrical, thermal, hydraulic, pneumatic, gaseous, mechanical or described by any other physical or chemical process.

Generally, a control system is designed to meet one of two objectives. First, a servomechanism is designed to follow changes in setpoint as closely as possible. Many electrical or mechanical control systems are servomechanisms. Second, a regulator is designed to keep output constant despite changes in a load or other disturbances. Regulatory controls are widely used for controlling chemical processes. In general, tracking control systems monitor setpoint changes and make appropriate adjustments. Regulatory control systems adjust to compensate for process disturbances.

The stability, accuracy and speed of response of a control system are determined by analyzing the steady state and the transient performance. It is desirable to achieve the steady state in the shortest possible time, while maintaining the output within specified limits. Steady-state performance is evaluated in terms of the accuracy with which the output is controlled for a specified input. The transient performance, i.e., the behavior of the output variable as the system changes from one steady-state condition to another, is evaluated in terms of such quantities as maximum overshoot, rise time and response time.

A number of factors affect the quality of control, including the disturbances caused by setpoint changes and process load changes. Both setpoint and process load may be defined in terms of the setting of the final control element to maintain the control variable at the setpoint. Thus, both cause the final control element to reposition. Other disturbances may be variations in inlet process fluid temperature and cooling water temperature in a water chiller, for example.

In many control systems, a step input response results in overshoot. However, a step input is widely used for analysis for many reasons. First of all, testing is easily implemented. Second, the step input is the most severe disturbance, and the response to a step input shows the maximum error that can occur. Features of transient performance include the existence and magnitude of the maximum overshoot, the frequency of the transient oscillation and the response time.

In certain instances, the output variable overshoots its desired steady state condition and transient oscillation occurs. The first overshoot is the greatest and its effect is a concern to the designer. The primary considerations for limiting this maximum overshoot are (1) to avoid damage to the process or machine due to excessive excursions of the controlled variable beyond that specified by the command signal and (2) to avoid the excessive settling time associated with highly underdamped systems.

As mentioned above, control systems may be used as process regulators or tracking controls. For example, absorption chillers are used in industrial applications. In these applications, the chiller controls may be required to perform more of a tracking control function. Water chiller controls for comfort chilling are mainly process regulators. The chiller controls evaporator leaving chilled water to a setpoint that may never be changed. For this type of application, it is usually desirable to use a relatively high integral gain in a PID (proportional, integral and derivative) control loop to eliminate error in leaving water temperature caused by a process disturbance. Typically, a higher integral gain is beneficial since it allows the control system to respond faster to load disturbances. However, one of the problems with using a large integral gain is, at startup, the control overshoots its setpoint. Another problem caused by the high integral gain is a shut down on low temperature.

Such an overshoot problem has previously been addressed with a control function called "softloading." During a setpoint change, or at startup, the chiller system experiences an immediate and substantial change. The typical response of the chiller system is to load up to 100% to meet the change. To compensate for this major change, the softloading function limits the commanded output from the controller at startup to slow down the loading on the chiller.

However, the softloading function also has certain problems. For example, the softloading is arranged at the back end of the control system, which makes the function difficult to implement. Since the softloading function limits the commanded output, not the input, the manner in which the output is limited changes with different types of control systems in different machines. For example, to limit a water temperature change, the softloading function must limit the command to control the water temperature. Also, the manner of limiting the command is a function of what is being controlled. For each system, this requires that the command be tweaked for every system. In addition, a large amount of empirical work is needed to get the response to be well-behaved.

An additional control concern occurs in certain instances in which the leaving water temperature setpoint needs to be changed. Again, with a large integral gain, a large overshoot results. Also, there are comfort cooling applications in which the chilled water setpoint is changed on a daily basis. For example, the temperature may be raised at night and lowered during the day. These regular changes also cause the overshoot problems discussed above.

Therefore, with regulator control, it is desirable to push the integral control higher to make the system respond faster.

This increased integral control typically works fine until a setpoint change is required. Then the increased integral gain on the setpoint change will be excessive and cause overshoot. However, when the same system attempts to perform a tracking type control, overshoot will occur. As a result, a need exists for a control system which eliminates overshoot without reducing the response to process disturbances.

BRIEF SUMMARY OF THE INVENTION

To this end, an embodiment of the present invention provides a control system which eliminates overshoot without reducing the response to process disturbances. In particular, an embodiment of the control system includes a binomial setpoint filter for filtering setpoint changes to provide a more gradual response that consequently eliminates overshoot.

One aspect of the invention is a method of controlling a water chiller to provide a supply of chilled water at a preselected temperature representing the nominal setpoint of the system. The water chiller has a control system having an input. The method is carried out as follows. A nominal setpoint temperature is selected. The setpoint temperature is filtered, using a binomial filter, to provide a filtered setpoint temperature. The filtered setpoint temperature is then provided to the input of the control system. The filtered setpoint temperature is a function of time and temperature. Preferably, the filtered setpoint temperature is initially the current temperature of the chilled water, then changes as a function of time to asymptotically approach the nominal setpoint temperature.

A more general aspect of the invention is a control system comprising a system input, a feedback loop, and a binomial filter having a setpoint input and a filtered setpoint output. The feedback loop is connected to the system input via a summing node. The binomial filter is arranged to receive a nominal setpoint at its setpoint input and provide in response a filtered setpoint output to the system input via the summing node.

Another aspect of the invention is a method of reducing overshoot in a control system. A control system is provided having an input. A nominal setpoint is selected. The nominal setpoint is filtered, using a binomial filter, to provide a filtered setpoint. The filtered setpoint is provided to the input of the control system. The filtered setpoint approaches the nominal setpoint asymptotically thus reducing or eliminating overshoot of the nominal setpoint.

An advantage of an embodiment of the control system having a binomial setpoint filter is that using the filtered setpoint allows using more integral gain in the control system to respond faster to load disturbances, while responding to startups and setpoint changes without causing overshoot.

Also, an advantage of an embodiment of the control system having a binomial setpoint filter is that using the filtered setpoint for softloading is relatively simple to implement. For example, instead of limiting the output command, the filter works on the front end to drive the control response to follow a desired trajectory. In an embodiment, a critically damped second order response is the desired trajectory which is obtained using a second order binomial filter. Such a binomial filter provides a gradual rise to the desired setpoint instead of an abrupt one, as is the case without a filter or with a first order filter.

Another advantage of an embodiment of the control system having a binomial setpoint filter is that by filtering the setpoint, the control system does not see a step input when the temperature setpoint is changed. In contrast, the response is more like a series of small process disturbances.

A further advantage of an embodiment of the control system having a binomial setpoint filter is that it uses closed loop controls already in place for leaving water temperature control, since the binomial setpoint filtering is performed at the front end, or input side, of the control system.

BRIEF DESCRIPTION OF THE SEVERAL VIEWS OF THE DRAWING

FIG. 5 is a block diagram of an embodiment of a process control system illustrating an absorber chiller having a second order binomial filter for filtering a setpoint in the control system operating in accordance with the apparatus and method of the present invention.

DETAILED DESCRIPTION OF THE INVENTION

The main function of a control system applied to a water chiller, for example, is process regulation. Process regulation involves maintaining chilled leaving water at a desired temperature. Thus, the control system must respond quickly to process disturbances to minimize the magnitude and the duration of differences between the leaving water temperature and the desired setpoint. To minimize these differences, the control response can be adjusted to favor the integral action.

As set forth above, problems may be encountered in certain instances. For example, when setpoint changes are made, and during setup, high integral gains cause the system to overshoot the setpoint significantly. By filtering setpoint changes, overshoot can be eliminated without reducing the response to process disturbances.

An embodiment of the setpoint filter of the present invention has another functional advantage. During the prestart sequence of the chiller, the filtered setpoint is initialized to the current leaving water temperature. When closed loop control takes over, the initial error in leaving water temperature is zero. As the filtered setpoint approaches the desired setpoint, a small error will be detected by closed loop control. The control system will track the filtered setpoint as it changes over time. The time it takes the filtered setpoint to reach the desired setpoint is the settling time. By allowing the settling time to be an adjustable input, the filtered setpoint will replace what is known as a "softloading" function. The advantage of using the filtered setpoint for softloading on the front end of the control system is that it uses the closed loop controls that are already in place for the leaving water temperature control. This simplifies implementation and verification of the function.

Figure 1:
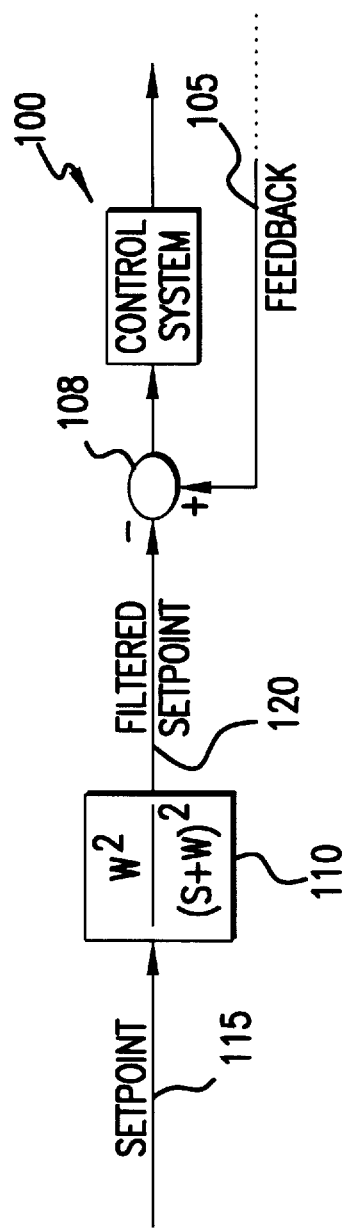
FIG. 1 is a block diagram of an embodiment of a control system of the present invention illustrating a second order binomial filter for filtering a setpoint in the control system.

An embodiment of a second order binomial filter designed to prefilter the control setpoint is shown by the block diagram in FIG. 1. A control system 100 is illustrated. The control system 100 includes a feedback loop 105 with a summing node 108. FIG. 1 also illustrates a binomial filter referenced generally at 110. The binomial filter 110 is connected and arranged to receive a setpoint input 115. The binomial setpoint filter 110 subsequently provides an output of a filtered setpoint referenced 120. The filtered setpoint 120 is connected via the summing node 108 as an input to the control system 100 and feedback loop 105. As shown in FIG. 1, the binomial setpoint filter 110 is arranged at the input side of the control system 100.

Figure 2:
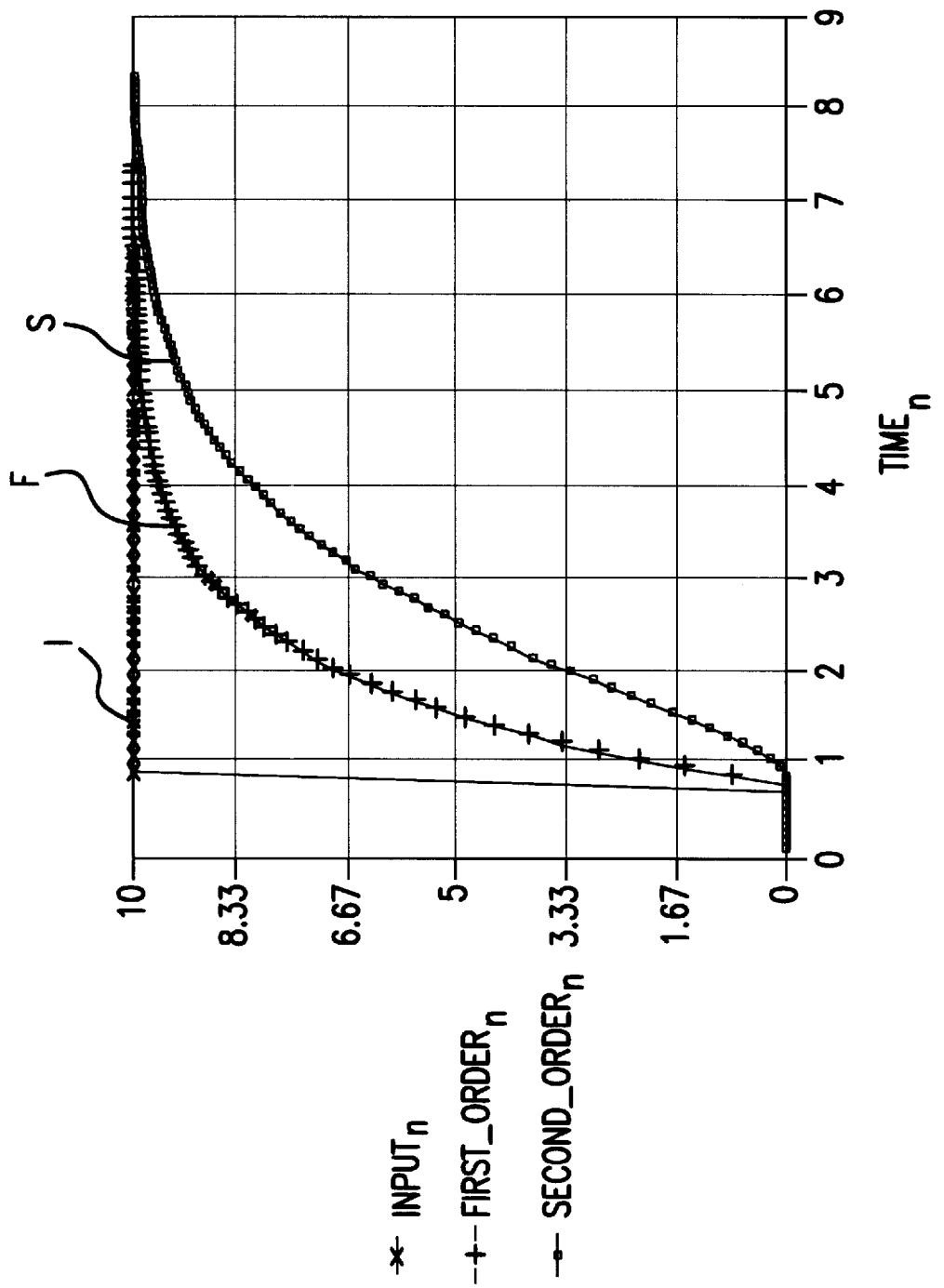
FIG. 2 is a graph illustrating responses of first and second order filters to a step input.

FIG. 2 illustrates responses to a step input. For example, the ideal response of the control system to the step input is a critically-damped to slightly underdamped second order function (see FIG. 2). The filter receives a step input (in a typical method, the leaving water temperature setpoint is changed) and outputs a critically-damped second order output. If the settling time of the filter is small enough that the cut-off frequency is within the bandwidth of the open loop system, prefiltering the setpoint does not increase the settling time.

As shown in FIG. 2, the input is a step input indicated by reference letter I. A response curve of a first order filter is indicated by a reference letter F. The first order filter response F has a steep slope near the origin which causes an abrupt discontinuity at the beginning of the step input. In contrast to the first order response, a second order response curve indicated by reference letter S is also shown. As indicated in FIG. 2, the second order response curve S has a gradual slope at the beginning of the curve to provide a smoother transition in response to the step input. As can be seen from FIG. 2, the first order response F converges to the step input I slightly sooner than the second order response S. However, the second order response S is within acceptable response time limits.

Figure 3:
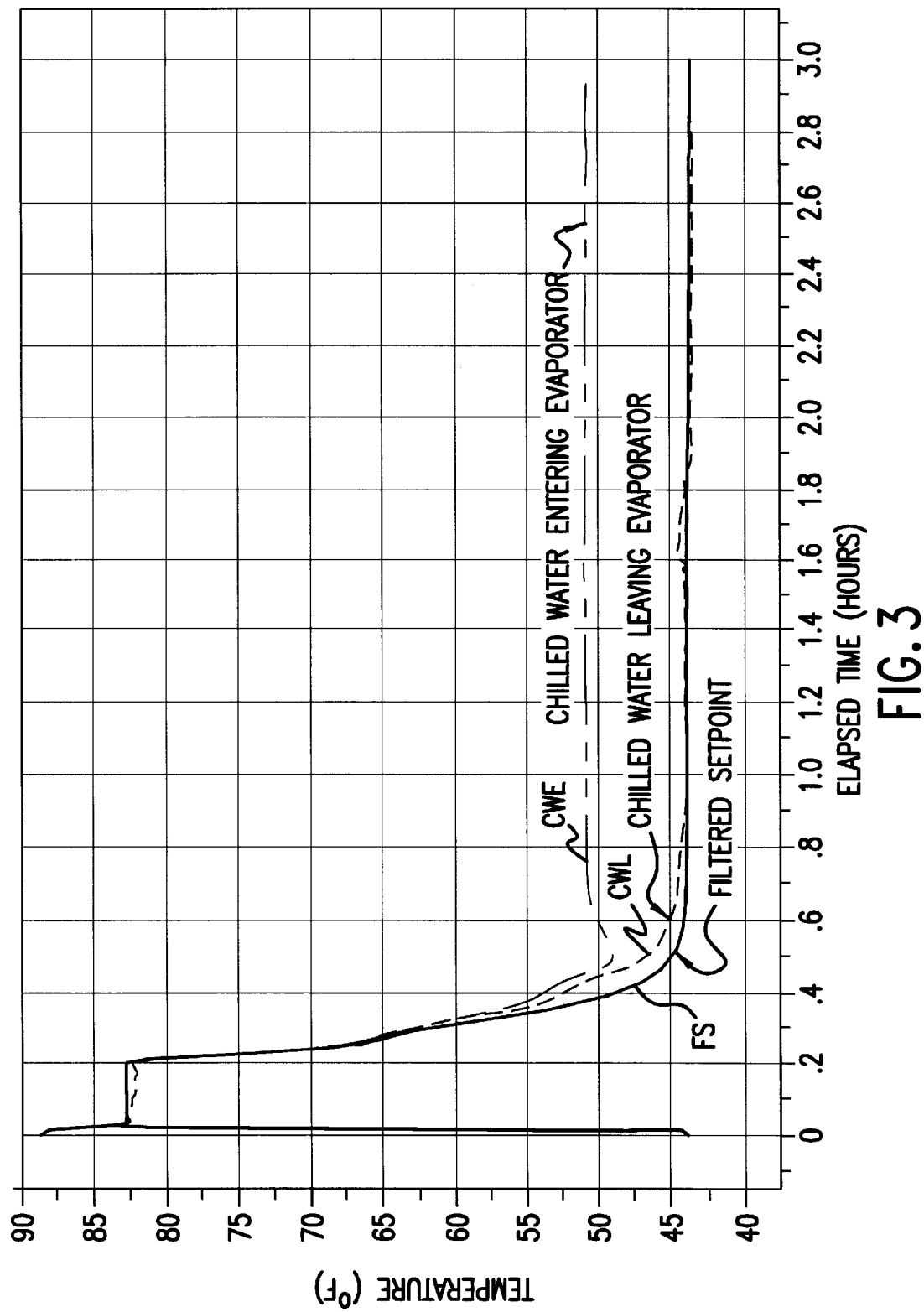
FIG. 3 is a graph illustrating chilled water leaving temperature with respect to time relative to a binomially filtered setpoint temperature in a control system, at startup, operating in accordance with the apparatus and method of the present invention.

FIG. 3 is a graph illustrating a series of curves. The curves illustrate the operation of the binomial setpoint filter 110 in an absorption water chiller operating in accordance with the apparatus and method of the present invention. The graph of FIG. 3 indicates temperature on the vertical axis and elapsed time on the horizontal axis.

As illustrated, the first few minutes involve starting the burner and the pumps in the chiller. For the first 12 minutes, the chiller is being preheated and the system is run for the time period indicated. At approximately the 12 minute point, the controls are released and the binomial setpoint filter 110 is initialized to be the same as the leaving water temperature. Once the controls are released, it is preferred that the system follow the filtered setpoint as indicated in FIG. 3.

In FIG. 3, the water begins at approximately 82° F. but the filter setpoint indicated by FS comes down to 44° F. The chilled water leaving the evaporator curve referenced CWL also nearly follows the filtered setpoint FS downward as indicated in FIG. 3. The error between the filtered setpoint FS and the chiller water leaving CWL is the feedback to the control system. FIG. 3 shows that the error is not as large as if the chiller had just started at the 44° setpoint and the 80°–83° chilled water temperature. Thus, the binomial setpoint filtering within the embodiment of the present invention eliminates the occurrence of a large error at the initial startup. Binomial filtering of the setpoint brings the chilled water temperature down at a more gradual, smoother rate. In addition, as shown in FIG. 3, there is no overshoot of the chilled water leaving evaporator curve CWL versus the filtered setpoint curve FS. Chilled water entering the evaporator curve CWE is also shown. The chilled water entering evaporator curve CVWE illustrates that a loop controller tries to maintain the entering temperature once it reaches approximately the 51° level as indicated in FIG. 3. FIG. 3 shows a slight bit of overshoot in the chilled water entering the evaporator. Then a load is added as the water temperature comes down.

Since the binomial setpoint filter 110 is arranged at the front end or input of the control system (see FIG. 1), as opposed to at the output, the response is gradual as shown in FIG. 2. Without the binomial filter 110, the absorber chiller would have immediately tried to load up to 100% due to the 44° setpoint differential. As the water temperature came at a fast rate, the chiller would then try to limit the loading. In certain slower systems, that sequence does not work well because the chiller receives a full load before the water temperature would change. Thus the prior manner of softloading is more reactionary and difficult to implement. In contrast however, the binomial setpoint prefiltering at the input stage of the control system overcomes these problems as discussed above.

Figure 4:
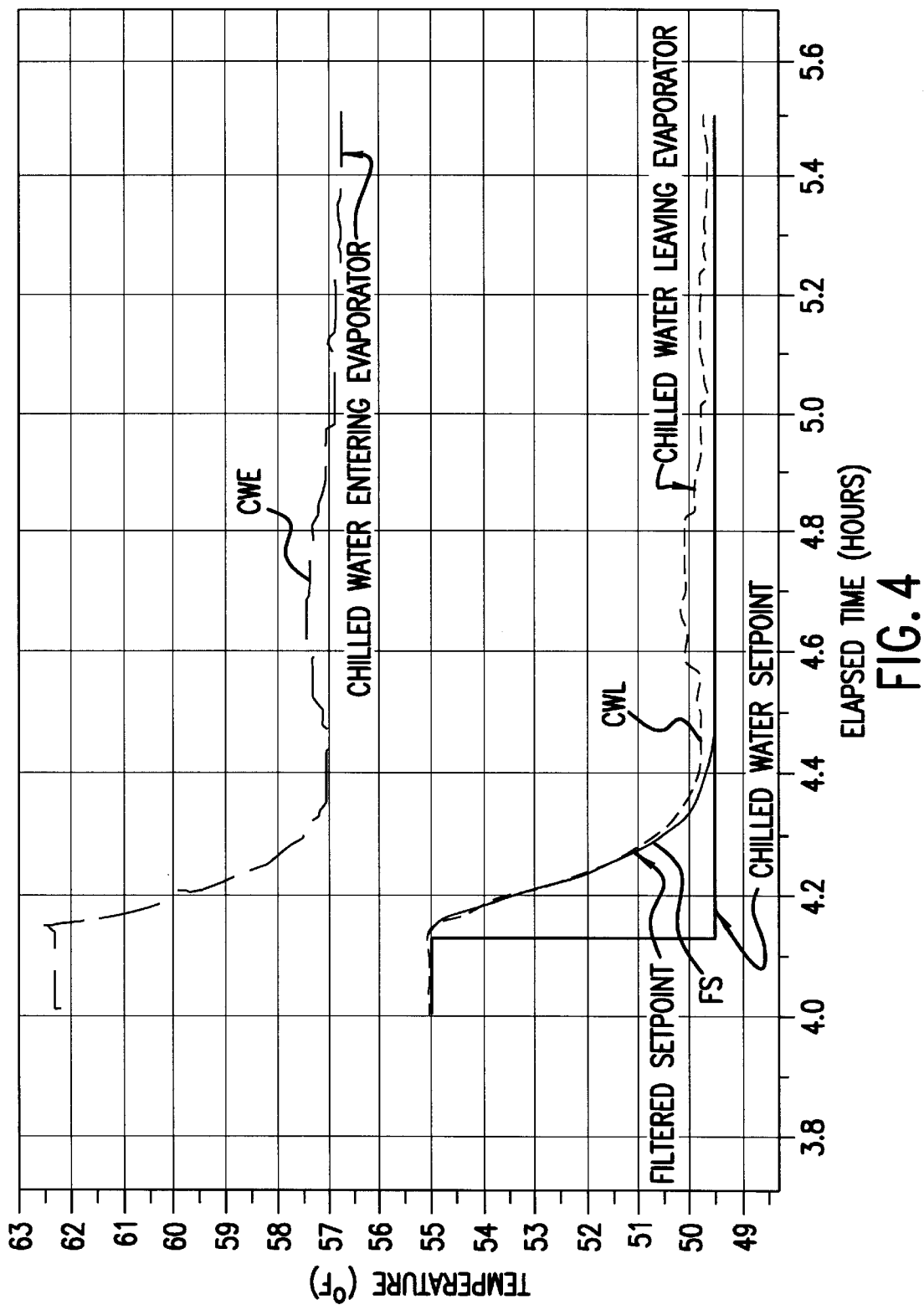
FIG. 4 is a graph illustrating chilled water leaving temperature with respect to time relative to a binomially filtered setpoint temperature as a result of a setpoint change in a control system operating in accordance with the apparatus and method of the present invention.

FIG. 4 graphically illustrates the situation in which an absorption chiller, for example, has a constant load and is then subjected to a drop in the setpoint. In FIG. 4, the drop is from approximately 55° down to 49.5°. Also, the chilled water entering the evaporator according to the curve CWE is illustrated. FIG. 4 is similar to the response illustrated in FIG. 2, only in an inverted manner.

FIG. 4 illustrates a situation where an operator resets the water temperature in the morning, for example, after having the chiller temperature set for comfort cooling at a higher temperature setpoint during the night. Thus, the user desires to lower the cooling water temperature during the day.

Thus, FIG. 4 shows that the setpoint has decreased from 55° F. down to 49.5° F. The second order response of the binomial setpoint filter similar to that of FIG. 2 is shown. The water temperature comes down at almost a steady rate and gradually comes into the setpoint. The dotted line represents the chilled water leaving the evaporator. Without the binomial setpoint filtering, the initial decrease in water temperature would cause a 60° F. temperature error all at one time. However, the filtering of the setpoint using the binomial setpoint filter of the present invention increases the load only slightly represented as a series of smaller changes instead of pulling the chiller to fill load immediately. Thus, the present invention acts more like a series of process disturbances all in a row instead of one large jump that kicks the chiller into a 100% operative state. As a result, the present invention avoids loading up the chiller to 100% and then having the temperature come down so quickly that the chiller backs off in a rapid manner in response.

The actual filter setpoint will converge in the settling time, but nothing is done to reset it until the machine is turned off. The chiller is then set to the actual leaving water temperature. Otherwise, the chiller just follows the actual setpoint.

An additional advantage of the present invention is that in the opposite situation, for example, changing the setpoint from 49° F. to 55° F. the present invention operates equally beneficially. For example, on most known chillers there is something known as a differential stop. If one tries to raise the setpoint greater than a certain amount representing the differential stop, the machine shuts off immediately because of a violation of the differential stop maximum. However, because of the gradual nature of the binomial setpoint filter as explained above, the chiller operating in accordance with the principles of an embodiment of the present invention would gradually increase the load and raise the leaving water temperature without shutting off.

FIG. 5 is another embodiment of the present invention. FIG. 5 illustrates an absorber chiller as part of a larger process. For example, the absorber indicated in FIG. 5 incorporates a binomial setpoint filter 110 as explained above. In this application, the absorption chiller is just part of the overall system of a larger scale. In this application, chiller controls may be required to perform more of a tracking control function as indicated in FIG. 5. In this type of application, the response of the chiller is defined by the binomial setpoint filter 110. This makes the design of the process controls illustrated in FIG. 5 easier because the dynamics of the chiller are already well defined.

Thus, the present invention makes use of filtering a setpoint to avoid overshoot while maintaining response to process disturbances. As discussed above, a first order filter could be used; however, comparison of the responses of a first and a second order filter with reference to FIG. 2 shows that the second order filter has a smoother initial response. In contrast, the initial response of the first order filter is rather abrupt.

A first order filter or a second order filter can be implemented digitally. This is beneficial since the digital implementation and mathematical representation of the filters can be easily programmable using a computer. Further, such programmability allows a microprocessor to be used in the control system. The following methodology can be used to develop a discrete representation of a first order digital filter. As set forth above, the result is in a form that is easily programmable using a microprocessor, or the like.

To begin with, a first order Laplace transfer function is used:

$$G(s) = \frac{a}{s+a}$$

where a is the cut off frequency of the filter.

Next, the impulse transfer function is calculated from the following:

$$\Gamma(s) = \Sigma \text{residues of} F(p)(1/1-e^{-(s-p)\cdot T})$$

$F(p)=(1-e^{St}/s)(a/s+a)_{s=p}$ where $F(p)$ is the Laplace transform of a zero order hold with s replaced by p.

The poles of $F(p)$ are 0 and $-a$. Therefore, the impulse transfer function is:

$$\Gamma(s)=[(1-e^{-s\cdot T}/p)(a)(1/1-e^{-(s-p)\cdot T})]_{p=-a}+[(1-e^{-s\cdot T})(a/p+a)(1/1-e^{-(s-p)\cdot T})]_{p=0}$$

$$\Gamma(s)=[(1-e^{-s\cdot T})(-1/1-e^{-(s+a)\cdot T})]=[(1-e^{-s\cdot T})(1/1-e^{-s\cdot T})]$$

$$\Gamma(s)=e^{-s\cdot T}(1-e^{-a\cdot T})/1-e^{-s\cdot T}\cdot e^{-a\cdot T}$$

Conversion to the Z domain is performed by substituting as follows:

$$Z^{-1}=e^{-s\cdot T}$$

$$\Gamma(z)=(z^{-1})(1-e^{-a\cdot T})/1-(z^{-1})\cdot e^{-a\cdot T}$$

Finally, conversion to programmable form is performed by:

$$\Gamma(z)=O(z)/I(z)$$

$$O(z)\cdot[1-(z^{-1})\cdot e^{-a\cdot T}]=I(z)\cdot[(z^{-1})\cdot(1-e^{-a\cdot T})]$$

$$O(z)\cdot[1-e^{-a\cdot T}]\cdot I_{n-1}+e^{-a\cdot T}\cdot O_{n-1}$$

n=2 ... 10

$O_0:=0$ step:=10 ... 100

$I_{n-1}:=0$

Let Settling time :=5–60 minutes $$\omega_c:=\frac{5}{\text{Settling time}}$$

$O_1:=0$

T:=5 sec $I_{step}:=10$ $\text{Time}_n:=n\cdot T/60$ $\alpha:=\omega_c$ $O_n:=(1-e^{-\alpha\cdot T})\cdot I_{n-1}+e^{-\alpha\cdot T}\cdot O_{n-1}$ Thus, the above equation can be implemented digitally in a programmable form on a computer or microprocessor. Similarly, a binomial filter can be represented in programmable form. A binomial filter is defined as having identical and real pole locations. A binomial filter also has the features of slow response with no overshoot. The programmable form of a binomial filter is determined in the same basic manner set forth above with respect to the first order filter. The main equations are set forth below.

Laplace form:

$$G(s)=\omega c^2/(s+\omega_c)^2$$

Z transform:

$$G(z)=z\cdot(1-e^{-T\cdot\omega c}-\omega_c\cdot T\cdot e^{-T\cdot\omega c})+e^{-T\cdot c}\cdot(e^{-T\cdot\omega c}-1+\omega_c\cdot T)/(z-e^{-\omega c T})^2$$

An algorithm for an embodiment of the second order filter 110 follows:

$$\text{Cutoff frequency} = \frac{5}{\text{Settling Time}*60}$$

$$\alpha=e^{\Delta t*\text{Cutoff frequency}}$$

Coeff1=1−α−Cutoff frequency*Δt*α

Coeff2=−α*(1−α−Cutoff frequency*Δt)

Coeff3=2*α

Coeff4=1−Coeff1−Coeff2−Coeff3 where

Δt=Cycle Time

The calculation of coefficient α can be approximated by a series expansion. The first 3 terms of the expansion yield adequate results:

α=1−Δ2t*Cutoff frequency+Δt*Δt*Cutoff frequency*Cutoff frequency/2.

Thus, the binomial filter represented in programmable form is as follows:

Filtered Setpoint$_n$=Coeff1*Setpoint$_{n-1}$+Coeff2*Setpoint$_{n-2}$+ Coeff3*Filtered Setpoint$_{n-1}$+Coeff4*Filtered Setpoint$_{n-2}$ Also, a first order plant with a PID controller will behave as a second-order function. Thus, the system will naturally follow the second order setpoint. Response of a second order function can be characterized by specifying the natural frequency and damping for the function. By choosing a binomial function (two identical poles) the response is critically damped, which means that the response is damped as fast as possible without overshoot. Thus, only one parameter needs to be set, the settling time.

By prefiltering the setpoint, the control system does not see a sudden, large error in the leaving water temperature when the setpoint is changed. When a step change is made to the leaving water temperature setpoint, the filtered setpoint changes a small fraction of the step every control cycle, thus the control system sees only a small error in the leaving water temperature and reacts accordingly. As the filtered setpoint continues to change, the control system will see a small but persistent error term and will continue to change the leaving water temperature. The filtered setpoint will start to approach the actual setpoint asymptotically. Because the filtered setpoint slowly approaches the actual setpoint, the control will react to prevent the leaving water temperature from overshooting the desired setpoint (or at least will minimize the overshoot).

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

I claim:

1. A method of controlling a water chiller system to provide a supply of leaving water at a preselected temperature, the method comprising the steps of:

providing a control system for the water chiller system, the control system having an input;

selecting a setpoint temperature;

filtering the setpoint temperature using a binomial filter to provide a filtered setpoint; and providing the filtered setpoint to the input of the control system.

2. The method of claim 1, further comprising the step of:

initializing the filtered setpoint to be approximately equal to a current temperature of the leaving water.

3. The method of claim 1, further comprising the step of:

providing a gradual transition from the current temperature of the leaving water to a desired setpoint temperature.

4. A control system comprising:

a system input;

a feedback loop connected to the system input via a summing node; and a binomial filter arranged to receive a setpoint input and to provide a filtered setpoint output to the control system via the summing node.

5. The control system of claim 4 wherein the binomial filter provides a filtered setpoint output having a gradual initial response to the control system via the summing node.

6. A method of reducing overshoot in a control system, comprising the steps of:

providing a control system having an input;

selecting a setpoint;

filtering the setpoint using a binomial filter to provide a filtered setpoint; and providing the filtered setpoint to the input of the control system.

7. The method of claim 6, further comprising the step of:

initializing the filtered setpoint to equal a current control parameter in the control system.

8. The method of claim 6, further comprising the step of:

providing a filtered setpoint having a gradual initial response to the input of the control system.

* * * * *